A. B. CHANCE.
ATTACHMENT FOR CORN PLANTERS.
APPLICATION FILED JAN. 3, 1911.
1,014,206.
Patented Jan. 9, 1912.
2 SHEETS—SHEET 1.
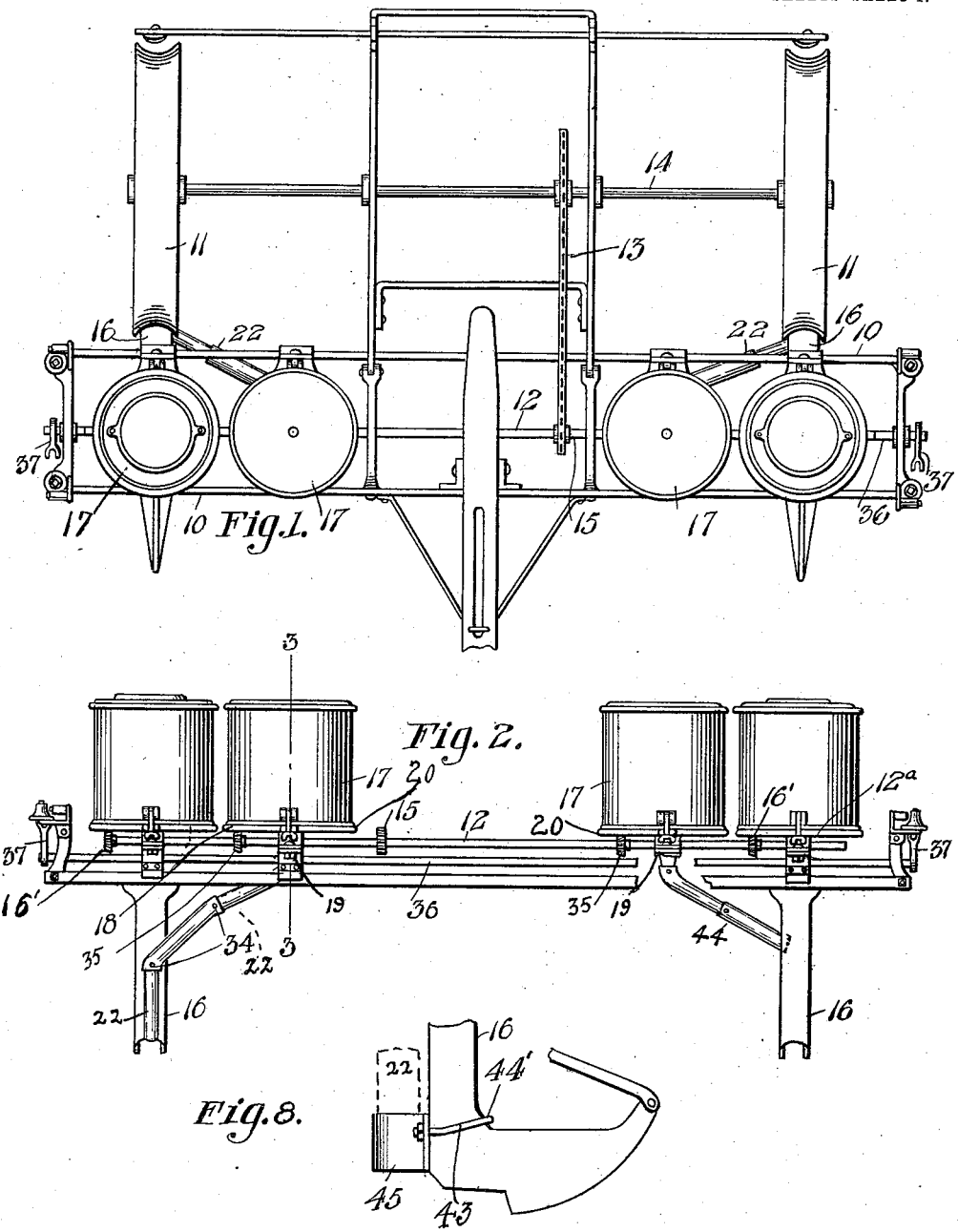
WITNESSES
INVENTOR

A. B. CHANCE.
ATTACHMENT FOR CORN PLANTERS.
APPLICATION FILED JAN. 3, 1911.

1,014,206.

Patented Jan. 9, 1912.

2 SHEETS—SHEET 2.

WITNESSES
G. M. Sprung.
L. E. Barkley.

INVENTOR
Albert B. Chance,
by Frank S. Ankerman
Attorney

UNITED STATES PATENT OFFICE.

ALBERT B. CHANCE, OF CENTRALIA, MISSOURI.

ATTACHMENT FOR CORN-PLANTERS.

1,014,206.  Specification of Letters Patent.  Patented Jan. 9, 1912.

Application filed January 3, 1911. Serial No. 600,393.

*To all whom it may concern:*

Be it known that I, ALBERT B. CHANCE, a citizen of the United States of America, and resident of Centralia, in the county of Boone and State of Missouri, have invented certain new and useful Improvements in Attachments for Corn-Planters, of which the following is a specification.

This invention relates to seeders and planters and particularly to planters for corn and other grain, the invention being designed primarily as an attachment for corn planters, the said attachment being intended to distribute fertilizer or seed such as peas, beans or other seeds which may be planted with corn.

An object of this invention is to provide an attachment which can be readily applied to corn planters now in common use, the said attachment being driven or operated by a suitable connection with the usual feeder drive shaft of corn planters, thus enabling the application of the attachment embodying this invention to such corn planters as are now in common use without the change of construction or without augmenting parts other than those comprised within the attachment associated with parts which may be applied to the said drive shaft.

A still further object of this invention is to provide an attachment for corn planters having interchangeable chutes or pipes in order to deliver material from the hopper of the attachment to the chutes or tubes of an ordinary corn planter or to a point in the rear of the shoe of such corn planter. In other words, one interchangeable tube is designed to operate in conjunction with the attachment when fertilizer is to be distributed, whereas another interchangeable tube is to be substituted for delivering grain and seed other than that distributed by the corn planter.

With the foregoing and other objects in view, the invention consists in the details of construction and in the arrangement and combination of parts to be hereinafter more fully set forth and claimed.

In describing the invention in detail, reference will be had to the accompanying drawings forming a part of this specification, wherein like characters denote corresponding parts in the several views, and in which—

Figure 3:
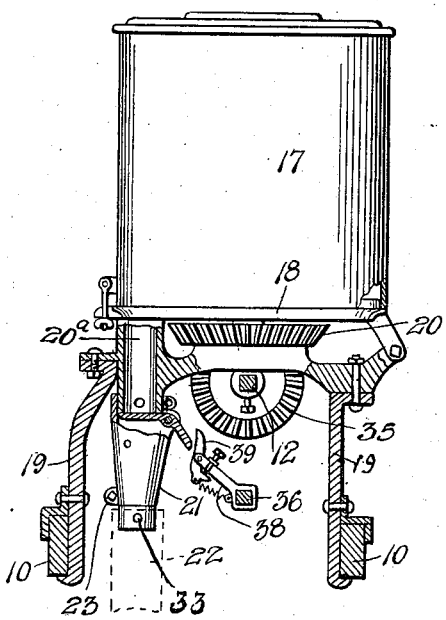
Figure 4:
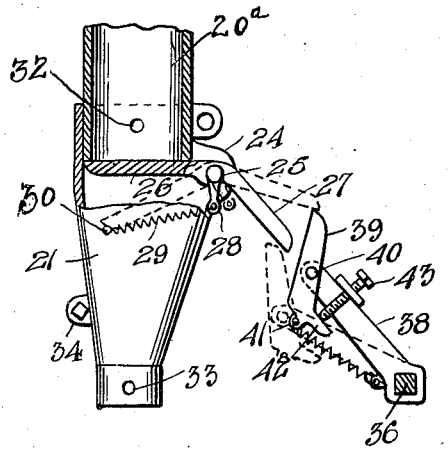
Figure 6:
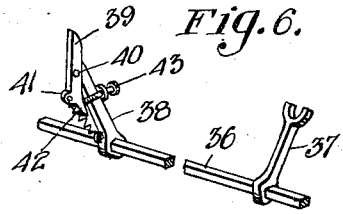
Figure 5:
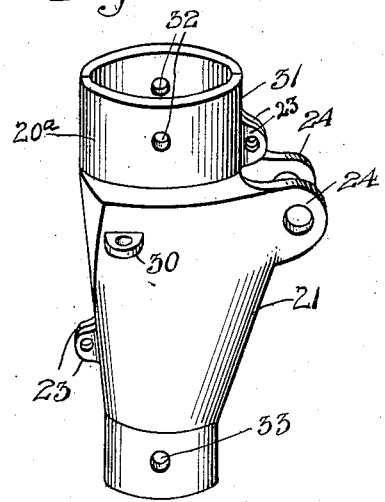
Figure 7:
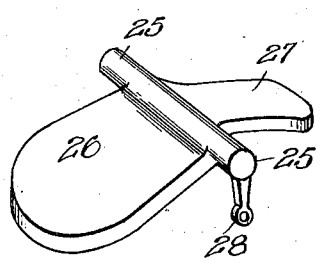

Figure 1 is a top plan view of a fragment of a corn planter embodying the invention; Fig. 2 illustrates a rear elevation thereof; Fig. 3 illustrates an enlarged detail, partly in section showing the attachment; Fig. 4 illustrates a view in elevation partly in section of the feeding and tripping mechanism on an enlarged scale; Fig. 5 illustrates a perspective view of the chute attachment; Fig. 6 illustrates a perspective view of the trip shaft with the tripping mechanism applied thereto; Fig. 7 illustrates a perspective view of a gate; and Fig. 8 illustrates an enlarged detail view showing the means for attaching a pipe to a shoe of the corn planter.

In these drawings 10 denotes a frame which is mounted on the traction wheels 11 of an ordinary corn planter, the said frame 10 having a drive shaft 12 for the feed mechanism journaled in hopper frames 12ª mounted thereon, said drive shaft being driven by the sprocket chain or other means of driving 13, taking motion from the shaft or axle 14, the said sprocket chain 13 being engaged by a gear wheel 15 mounted on the shaft 12.

It is to be understood that the hopper frames 12ª are of such ordinary types as are now employed in corn planters and the feed mechanism of such corn planters may not be shown in detail, except the gear wheels 16′ which are mounted on the shaft 12 for the purpose of driving the feed mechanism.

The attachment comprising the invention consists in the provision of a fertilizer or seed distributing attachment, preferably one for each of the corn planter mechanism; that is to say, where a planter is provided with means for planting two rows of corn a fertilizer or seed distributer is supplied for each of said planting mechanisms. The frame is provided with the usual shoes or furrow openers 16 through which the corn is fed, while being directed to the furrow and while I have described the element 16 as a shoe I wish to be understood as meaning thereby any device capable of forming a furrow whether it be a shoe, stub or disk. The attachment consists of the fertilizer cans 17 which are mounted on frames 18, supported by brackets 19, attached to the frame as shown in Fig. 3. Each frame 18 carries a beveled gear wheel 20 which is designed to turn a fertilizer agitating and feeding mechanism within the can not shown, but as the said mechanism within the can is an immaterial detail of construction, it will not be described in detail. It is sufficient to say that any type of disks, stirrers or feeders may be used so long as they are coupled with the sprocket gear wheel 20 to take motion therefrom. The frame 18 has an integral tube 20ª which receives fertilizer from the can and directs it to the housing 21 which is connected therewith, to which housing there is connected a chute 22 for directing material to the shoe 16.

While I have referred to the attachment as being for the purpose of distributing fertilizer, I also wish to be understood as claiming in this invention the function of feeding cow peas, beans or other seed or grain which may be planted with corn.

The housing 21 is shown as comprising two sections, each section having ears 23 and 24, the ears 23 and the ears 24 coinciding. The ears 24 are spaced apart and have apertures, and said ears form bearings for the trunnions 25 of the valve 26, which valve is oscillatingly mounted within the housing in position to engage the lower end of the tube 20ª and to operate in conjunction therewith for the purpose of controlling the passage of material through the tube when the planter is operated by a check row attachment. The valve 26 has a heel end 27 which projects in the path of travel of the tripping mechanism to be presently explained, and the trunnion 25 has an arm 28 to which a spring 29 is connected, the said spring being also connected to a lug 30 on the said housing 21. The housing is of irregular contour in cross section, the upper portion being circular consisting of a collar 31 which fits around the lower end of the tube 20ª and secured thereto by fastenings entering the apertures 32 of said collar. The intermediate portion of the housing is angular in cross section so as to permit the oscillation of the valve 26 therein whereas the lower end of the housing is similar in construction to the upper end thereof in order that the tube or chute 22 can be secured thereto by fastenings extending through the aperture 33.

The tube or chute 22 is shown as comprising a series of sections which are connected together at the points 34 thereby permitting a change of position of said tube or chute with relation to the shoe 16 for a purpose to be presently explained.

In the operation of the fertilizer feeding means, the gear wheel 20 is engaged by a bevel gear wheel 35 which is mounted on the shaft 12, which shaft is driven as heretofore described. The check shaft 36 has an arm 37 thereon engaged by a checking device for the purpose of operating the seed releasing mechanism such as is usually employed in check row corn planters. The shaft 36 is further provided with an arm 38 to which a dog 39 is pivoted by means of the pivotal pin 40, the said dog having a heel end 41 provided with a spring 42 which is pivoted to the arm 38 so that the heel end of the dog is normally drawn toward the inner end of the arm 38. A set screw 43 is threaded through the arm and has its end bearing against the heel end of the dog so that its position and time of action may be determined. As the shaft 36 has a rocking motion, the arm 38 carries the dog 39 and the relation of the arm and the parts carried thereby is such that the nose of the dog is normally in the path of travel of the heel end 27 of the valve, but owing to the manner of mounting the dog on the arm 38, the nose of the dog cams over the member 27 when the shaft 36 is returning to the normal position after being operated by the checking mechanism. When, however, the nose of the dog has passed the member 27 the spring holds the nose of the said dog normally in the path of travel of the member 27 when the checking mechanism operates to swing the arm 38 and the nose of the dog engages the member 27 and swings the valve 26 clear of the end of the tube 20ª to permit fertilizer or seed deposited therein to be discharged through the housing 21, and the chute or tube 22.

When it is desired to distribute fertilizer it is the purpose of the inventor to extend the tube or chute 22 to the rear of the shoe 16 and to provide the shoe with a clamp 43 which holds the lower end of the said tube or chute the said clamp being held on the shoe by a bolt 44' which embraces the shoe and has its end extending through the clamp 45. When fertilizer is to be distributed it is desirable to permit a layer of earth to intervene between the corn and the fertilizer and when the attachment is to be used for planting seed the long spout or chute 22 is dispensed with and instead a short tube 44 shown at right in Fig. 2 is extended from the housing 21 and leads through the wall of the shoe 16 so that the grain from the attachment will be discharged with the corn at each operation of the tripping mechanism.

It is well known that in most corn planters of the check row type the corn is fed from the hopper or can into the shoe prior to the time the check operating mechanism is actuated, and it is the purpose of the inventor to feed the corn from the hopper or can and to feed other seed, such as cow peas or the like from the can or hopper 17 at such predetermined times as corn is discharged into the shoe 16, so that the corn and other seed will be deposited in the shoe prior to the time the tripping mechanism is operated and therefore, as stated, effect the deposit of the corn and other seed in the earth simultaneously.

While I have shown the fertilizer distributers as being provided, one for each planter mechanism it is evident from the disclosure that it would be within the scope of the invention to provide two attachments for each corn planter mechanism and by coupling them to operate in conjunction with the planter mechanism to distribute fertilizer by means of one such attachment and to distribute seed such as cow peas, beans or the like by the other attachment simultaneously.

The members 19 shown in Fig. 3 as applied to the frame of the planter may be of such shape and design as to fit frames of the different makes of corn planters so that the fertilizer attachments can be secured to any type of corn planter.

I claim—

1. In a corn planter having a feed drive shaft and a check shaft, a fertilizer container, means associated with the feed drive shaft for actuating the fertilizer feeding mechanism, a tube into which the fertilizer feeder discharges, a housing on the tube, a valve in the housing closing the tube, an arm on the check shaft, a dog on the arm, means for pivotally mounting the dog on the arm, means for yieldingly holding the dog to operate the valve, and a tube on the housing for carrying the fertilizer.

2. In a corn planter having a feed drive shaft and a check shaft, a fertilizer container, means associated with the feed drive shaft for actuating fertilizer feeding mechanism, a tube into which the fertilizer feeder discharges, a housing on the tube, a valve in the housing closing the tube, an arm on the check shaft, a dog on the arm, means for pivotally mounting the dog on the arm, means for yieldingly holding the dog to operate the valve, a shoe, a tube associated with the shoe and connected to the housing for carrying the fertilizer.

3. In a corn planter having a feed drive shaft and a check shaft, a fertilizer container, means associated with the feed drive shaft for actuating the fertilizer feeding mechanism, a tube into which the fertilizer feeder discharges, integral spaced apertured ears extending from the housing, a valve comprising a body portion, and an angularly disposed heel portion, trunnions provided on said valve, said tunnions adapted to be journaled within the apertures provided in said ears, and means adapted to engage the said heel portion of the valve for operating the said valve, a tube on the housing for feeding the fertilizer.

In testimony whereof, I affix my signature in the presence of two witnesses.

ALBERT B. CHANCE.

Witnesses:
  LOTTIE E. BARKLEY,
  HELEN N. RAMSEY.

---

Copies of this patent may be obtained for five cents each, by addressing the "Commissioner of Patents, Washington, D. C."